Figure 1:
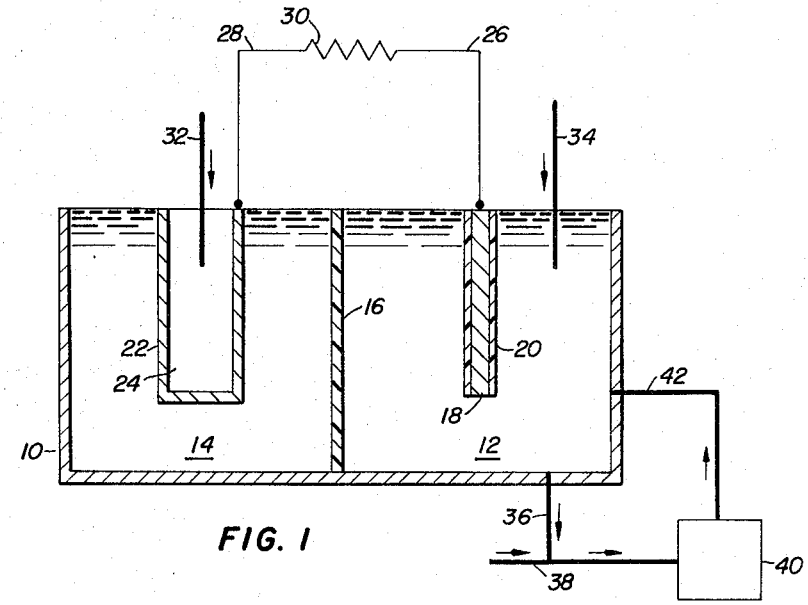

Jan. 24, 1967  D. L. KLASS  3,300,342
APPARATUS AND METHOD FOR ELECTROCHEMICALLY GENERATING
ELECTRICITY WITH POLYHYDRIC PHENOL POLYMER
Filed Aug. 2, 1962

INVENTOR.
DONALD L. KLASS
BY Edward H. Wang
ATTORNEY

United States Patent Office 3,300,342
Patented Jan. 24, 1967

3,300,342
APPARATUS AND METHOD FOR ELECTROCHEM-
ICALLY GENERATING ELECTRICITY WITH
POLYHYDRIC PHENOL POLYMER
Donald L. Klass, Barrington, Ill., assignor, by mesne assignments, to Union Oil Company of California, Los Angeles, Calif., a corporation of California
Filed Aug. 2, 1962, Ser. No. 214,378
10 Claims. (Cl. 136—86)

This invention relates to an electrochemical process for generating electricity and, more particularly, to fuel cells utilizing a reversibly-oxidizable polymer in combination with a primary fuel which is oxidized by the oxidized form of the polymer.

In recent years, fuel cells have received considerable attention in the continuing quest for improved sources of electrical energy. A fuel cell is an electrochemical device in which part or all of the energy of a chemical reaction is converted directly into direct-current electrical energy. One of the most significant advances of fuel cells over conventional methods of generating electricity is the directness by which chemical energy is converted into electrical energy. This direct conversion of energy eliminates the necessity of converting energy into heat, thereby making the Carnot-cycle efficiency limitation inapplicable. Other possible advantages of fuel cells are quietness, cleanliness, and the reduction or complete elimination of moving parts.

In general, a fuel cell electrochemically generates electricity by deriving electrical energy from a chemical reaction maintained by the continuous supply of a different reactant in effective proximity to each of two electrodes disposed in spaced relationship in an electrolyte. In the operation of a typical fuel cell utilizing an aqueous alkaline solution as the electrolyte, an oxidant is continuously introduced at the cathode where it contacts the electrolyte and forms ions, thereby imparting positive charges to the oxidant electrode. Simultaneously, a reductant is continuously introduced at the fuel electrode (anode) where it forms ions and leaves the anode negatively charged. The ions formed at the respective electrodes migrate in the electrolyte and unite, while electrical charges imparted to the electrodes are utilized as electrical energy by connecting an external circuit across the electrodes. For example, in the case of an oxygen-hydrogen fuel cell, the hydroxyl ions that are formed at the cathode and the hydrogen ions that are formed at the anode migrate across the aqueous alkaline electrolyte and unite to form water. An undesirable characteristic of many of the fuel cells which have been heretofore proposed is that the molecules formed by the uniting of the ions, such as water in the case of an oxygen-hydrogen fuel cell, accumulate in the electrolyte and result in a decline in the ability of the fuel cell to generate electricity.

Although hydrogen has been frequently utilized as the reductant in fuel cells, other fuel cell reductants which have been proposed and/or used include alcohols, ketones, ethers, paraffinic hydrocarbons, and aromatic hydrocarbons. As an example of a fuel cell utilizing a reductant other than hydrogen, the transformation of hydroquinone to quinone in a fuel cell can be separated into two half-cell reactions to yield useful electrical energy, as represented by the equations:

Reaction at anode:

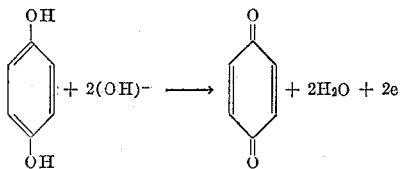

Reaction at cathode:

$$\tfrac{1}{2}O_2 + H_2O + 2e \rightarrow 2(OH)^-$$

Overall cell reaction:

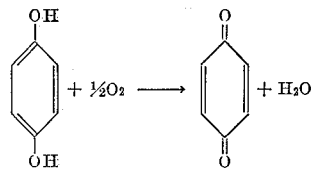

When the external circuit is closed, the reaction proceeds by the transfer of two electrons through the external circuit for every molecule of the hydroquinone oxidized. However, an oxygen-hydroquinone fuel cell has the following undesirable characteristics: (1) relatively little electrical energy is obtained before the hydroquinone has been consumed and the fuel cell has become exhausted; (2) the reactants in the anode chamber are gradually diluted by the water produced in the reaction, as in the case of an oxygen-hydrogen fuel cell, thereby reducing the current density on the electrode; and (3) the efficiency of the cell is adversely affected by the consumption of part of the hydroquinone in the formation of quinhydrone complex after part of the hydroquinone has been oxidized.

Copending patent application Serial No. 154,258, filed November 22, 1961, of D. L. Klass and L. E. Hutchings is directed to an oxygen-hydroquinone fuel cell wherein the aforementioned undesirable characteristics are eliminated and the efficiency of the cell is greatly enhanced. In the fuel cell of said copending patent application, the hydroquinone is utilized in combination with a compound which is oxidized less readily than the hydroquinone under the operating conditions of the cell, i.e., temperature, pressure, electrolytic environment, etc., but which is oxidizable by the quinone formed during the operation of the fuel cell. Illustrative of a suitable primary fuel is sodium hydrosulfite. The incorporation into the electrolyte of a compound that is oxidized by the quinone results in the immediate reduction of the quinone back to the corresponding hydroquinone for further participation in the anodic reaction and liberation of electrons. During the operation of such a fuel cell, the primary fuel is consumed, while the hydroquinone concentration is maintained substantially constant. In addition, the primary fuel prevents the formation of quinhydrone complex. Preferably, the hydroquinone and the fuel utilized are so chosen that water is consumed in the total reaction.

As a specific example of the fuel cell of said co-pending application, when the electrolyte contains in solution a hydroquinone, such as anthrahydroquinone-β-sulfonic acid sodium salt, in combination with a compound that is oxidized by the quinone in the operation of the fuel cell, such as sodium hydrosulfite, the following reactions proceed in the anodic section:

Reaction at anode:

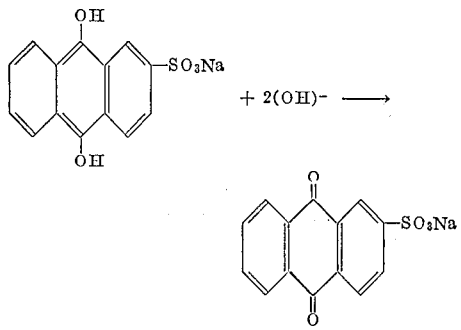

Regenerative reaction:

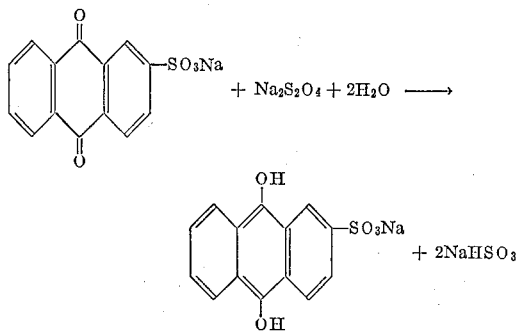

Overall anodic reaction:

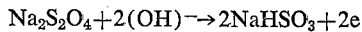

The fuel cell of said copending application can be operated by continuously withdrawing a portion of the anolyte, chemically or electrically regenerating the spent primary fuel, and adding the regenerated primary fuel and electrolyte to the fuel cell. However, from the above equations, it will be evident that the reversibly-oxidizable compound, as well as the fuel, remains in the anolyte and regeneration of the primary fuel must therefore be done under carefully controlled conditions so that the reversibly oxidizable compound is not destroyed.

This invention is based upon a fuel cell which is an improved version of the fuel cell of said copending application. In the fuel cell of this invention, the reversibly oxidizable compound is in the form of a polymer insoluble in the electrolyte and physically incorporated in or electrically connected to the anode, so that oxidized fuel can be continuously removed from the anolyte without removing the reversibly oxidizable compound.

Accordingly, the primary object of this invention is to provide a new electrochemical process for generating electricity.

Another object of this invention is to provide a fuel cell containing a reversibly oxidizable polymer and a fuel in the anodic section of the fuel cell.

Still another object of this invention is to provide a fuel cell containing in the anodic section of the electrolyte a reversibly oxidizable polymer physically or electrically connected to the anode and a fuel which is oxidized by the oxidized form of the reversibly oxidizable compound.

Figure 2:
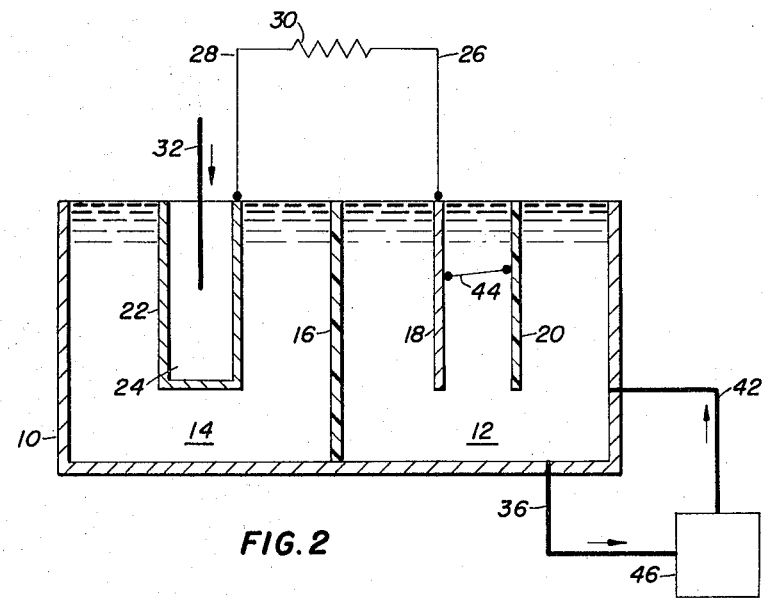

These and further objects of this invention will become apparent or be described as the description herein proceeds and reference is made to the accompanying drawings in which:

FIGURE 1 is a flow diagram, partly schematic and partly in cross-section, illustrating one embodiment of the fuel cell of this invention; and FIGURE 2 is a flow diagram, partly schematic and partly in cross-section, illustrating a fuel cell of this invention in combination with an auxiliary system for regenerating the primary fuel.

In accordance with this invention, free oxygen is continuously contacted with the electrolyte in effective proximity to the cathode so that it reacts chemically with the electrolyte and releases electrical charges to the cathode. The anode chamber contains a reversibly oxidizable polymer physically incorporated in or electrically connected to the anode that is oxidized and releases electrical charges to the anode. The electrolyte in the anode chamber contains a primary fuel which is a compound oxidized by the oxidized form of the reversibly oxidizable compound. The primary fuel may be contained in solution in the electrolyte or introduced into the electrolyte in effective proximity to the anode, depending upon its characteristics. The oxidized form of the reversibly oxidizable polymer produced during the operation of the fuel cell is converted back to the reduced form for further participation in the anodic reaction. If water is formed as a by-product by the oxidation of the polymer, the advantages in choosing a fuel which consumes water when it is oxidized by the polymer will be evident. Preferably, the reversibly oxidizable polymer and the primary fuel utilized are so chosen that when the polymer is reduced by the fuel, the same amount of water is consumed as when it is oxidized.

The reversibly oxidizable polymers which are utilized in the fuel cells of this invention are any of the polymers, such as those based upon polyhydric phenols, that will exchange electrons and can be used to conduct oxidation and reduction reactions. These types of polymers have substituent groups which can be reversibly-oxidized under a wide range of conditions. To make such a polymer based upon hydroquinone, polymerizable functions such as vinyl groups are attached to the hydroquinone molecules. The hydroxyl groups, which are polymerization inhibitors, may be masked by esterifying with benzoic acid. The product is polymerized to a molecular weight of between 50,000 and 60,000, and the benzoyl groups are then removed by saponification. Another example of a polymer which can be reversibly oxidized is a pyrogallol-formaldehyde resin. The molecular weight of the reversibly oxidizable polymers used in this invention must be high enough to prevent their solution in the electrolyte.

No criticality is claimed in the utilization of specific electrodes, with the exception that the reversibly oxidizable polymer is incorporated in or electrically connected to the anode, and any of the electrically conductive highly porous, high-surface area materials which have been heretofore proposed as electrodes may be used. For example, the anode and the cathode may be very porous, high-surface-area metals of the Raney type. Electrodes formed of Raney copper, Raney nickel, Raney silver, Raney platinum, etc., can be used inasmuch as these metals provide intimate contact for carrying out the electrochemical reactions involved in the fuel cell. Other suitable electrodes may be prepared in accordance with the methods described in U.S. Patents 2,901,523, 2,912,478, and 3,020,327. The electrodes may be, for example, in the form of hollow cylindrical porous bodies with the free oxygen-containing gas being passed into the interior of the cathode. A diffusion type fuel electrode can also be employed when a gaseous primary fuel is utilized. As in the case of most fuel cells, the electrodes must be chemically inert under the operating conditions of the cell.

The reversibly oxidizable polymer and the anode are disposed in the electrolyte in electron-conductive relationship with each other and a lead wire is connected to the anode, as to the cathode, for withdrawing electrical energy therefrom. By the term "electron-conductive relationship" it is meant that the polymer and anode are electrically connected in the ordinary meaning of the term, so that electrons can flow from the polymer to the anode. It is not sufficient to have the polymer and anode merely electrolytically connected, as by being disposed in spaced relationship in an alkaline electrolyte. The polymer and the anode may be electrically connected, as for example, by providing a lead wire between same or incorporating the polymer in the anode.

Suitable methods of incorporating the polymer in the anode include coating at least a portion of the anode with the polymer, or permeating the anode with the polymer. The anode may be permeated with the polymer as by pressing together under pressure a mixture of granules of the polymer and the anode material, such as graphite powder, carbon powder or metal powder, and thereafter sintering the mass. It will be evident that the pressing and sintering operations must be done under carefully controlled conditions so as not to be detrimental to the polymer. For example, the sintering temperature must be under the decomposition temperature of the polymer. If a Raney-type anode is used, the polymer must be inert with respect to the chemical utilized to dissolve out the proper component of the anode. The thickness of the polymer coating on the anode or the amount of the polymer in the anode will naturally depend on the particular fuel cell system and will be adjusted to give the maximum electrical output.

Some reversibly oxidizable polymers, of themselves, do not possess sufficient electrical conductivity to function satisfactorily in the fuel cells of my invention when used as a coating on the anode, or disposed in the electrolyte in spaced relationship to the anode and connected thereto by a lead wire. The electrical conductivity of such resins may be enhanced by impregnating the polymers with electrically conductive granules in an amount sufficient to enhance the conductivity thereof. The electrically conductive granules may be granules of carbon, metals, such as copper or iron, and materials with metallic conduction, such as nitrides or carbides of titanium and heavy metals, e.g., TiC, TiN, WC and MoC. The impregnation of polymers with the conductive materials will not be necessary when the polymers are themselves impregnated in the anode.

Since the primary reductant or fuel is a compound oxidizable by the oxidized form of the reversibly oxidizable polymer under conditions to convert the oxidized form of the polymer to the reduced form and it is a compound which is oxidized less readily than the polymer under the operating conditions of the fuel cell, i.e., temperature, pressure, electrolytic environment, etc., it will be evident that the specific primary fuel utilized will depend upon the characteristics of the polymer. The primary fuel can be either an organic or inorganic compound. Examples of primary fuels which may be used when the reversibly oxidizable polymer is based upon a polyhydric phenol are sodium hydrosulfite and hydrocarbons, such as ethylene. Water-soluble primary fuels can be mixed directly with the aqueous electrolyte solution. Water-insoluble primary fuels may also be used by incorporating a solubilizing agent with the aqueous electrolyte solution. Should a solubilizing agent be used, it will be evident that it must be substantially chemically inert with respect to the reversibly oxidizable polymer and electrolyte. Suitable solubilizing agents include the so-called neutral soaps consisting of a high-molecular-weight fatty acid radical bearing from 3 to 20 ethylene groups and an alcohol radical. A gaseous primary fuel can be added by being continuously bubbled through the electrolyte in effective proximity to the polymer or by being introduced through a porous anode in effective proximity to the polymer. Since the intermediate reduction of the oxidized form of the polymer, as it is formed, back to the reduced form is attained by the oxidation of the primary fuel, the primary fuel is preferably one that can be regenerated within the electrolyte, or whose oxidized form can be removed from the electrolyte and either discarded or regenerated.

The electrolyte utilized must not react directly to any appreciable extent in the non-ionized form with the oxygen-containing gas or reductants, and it must not change permanently its chemical composition during the operation of the fuel cell. In addition, it will be evident that the electrolyte utilized must permit the migration of the ions formed during the operation of the fuel cell. For example, the electrolyte may be alkaline or acidic, depending on the nature of the primary fuel and reversibly oxidizable polymer used. If an alkaline electrolyte is required, strong bases which produce large numbers of hydroxyl ions in the process of disassociation are preferred. Alkali metal hydroxides, such as lithium, sodium, and potassium hydroxide, are representative of strong basic electrolytes that can be used.

Although the fuel cell may comprise only one zone in which both the anode (including the reversibly oxidizable polymer) and the cathode are disposed, it is preferably divided into at least two zones in electrolytic communication with one another, with the anode and cathode being disposed in separate zones. Dividing the fuel cell into anodic and cathodic zones serves to concentrate the oxygen-containing gas in the cathodic zone and to concentrate the primary reductant in the anodic zone, while permitting the migration of the hydroxyl ions from the cathodic zone to the anodic zone. The electrolyte may be divided into separate zones as by salt bridges or ion-permeable membranes. The fuel cell may be divided by two ion-permeable membranes into three sections, an anodic section, a cathodic section, and an intermediate electrolyte section. Suitable ion-permeable membranes are known in the art and include animal tissue, various gels, including silica gel and alumina gel, sponge saturated with agar gel, and paper dipped in collodion or agar gel. Other suitable membranes may be formed by molding or casting a partially polymerized ion exchange resin into sheet form as described in "Amberplex Ion Permeable Resins," Rohm & Haas Co., Philadelphia, Pennsylvania, 1952. If the fuel cell is not divided into separate sections, it will be evident that the amount of the primary reductant or fuel required will be greater than if the cell is divided, and that the primary fuel must not react with oxygen or the cathode to any appreciable extent.

From the foregoing brief discussion, it will be evident that the selection of a particular component of the fuel cell will, at least to some extent, be governed by the other components and the operating conditions of the fuel cell. Thus, for example, the fuel cell container is made of any suitable material which is not attacked chemically by the reactants, electrolyte or reaction products. Other examples hereinbefore pointed out include the selection of the electrolyte, the electrodes, and the primary reductants.

There are several alternative methods of operating the fuel cell of this invention. In one embodiment, a portion of the electrolyte containing the oxidized form of the fuel is continuously removed from the fuel cell vessel while fresh electrolyte and fuel is added. The fuel cell can also be operated by being integrated into a continuous recirculating system for removing a portion of the electrolyte containing oxidized fuel, chemically or electrically regenerating the spent fuel, and adding the electrolyte and regenerated fuel back to the fuel cell vessel. In another embodiment of this invention, the fuel cell is operated as a storage battery by being used until part of or all of the fuel has been oxidized, and then reversibly charging the anolyte to reduce the oxidized form of fuel.

This invention is best understood by reference to the accompanying drawings, which are flow diagrams of two embodiments of the fuel cell of this invention, and wherein like numerals of reference refer to corresponding components in each of the figures. Referring to FIGURE 1, the numeral 10 designates the fuel cell vessel containing an aqueous alkaline electrolyte, such as concentrated aqueous potassium hydroxide solution, which is divided into anolyte 12 and catholyte 14 by ion-permeable membrane 16. Disposed in anolyte 12 is fuel electrode (anode) 18, which is platinum-black deposited on a nickel screen and coated with reversibly-oxidizable polymer 20. Polymer 20 may be, for example, a pyrogallol-formaldehyde resin of high enough molecular weight to prevent its solution in anolyte 12, and impregnated with particles of an electrical conductor, such as copper. Disposed in catholyte 14 is oxygen electrode (cathode) 22, which is a porous, carbon body, having hollow interior 24. Anode 18 and cathode 22 are connected through lead wires 26 and 28, respectively, to load 30 which can be any electrically operated or electrically energized device.

During the operation of the fuel cell, oxygen in the form of pure oxygen or an oxygen-containing gas, such as air, is introduced through line 32 into interior 24 of cathode 22 where it contacts catholyte 14 and forms hydroxyl ions, imparting positive charges to cathode 22. The hydroxyl ions thus formed migrate through membrane 16 into anolyte 12 where they oxidize polymer 20, thereby forming water and leaving anode 18 negatively charged. The electrical charges thus imparted to anode 18 and cathode 22 are utilized to operate load 30. Simultaneously, a compound oxidizable by the oxidized form of polymer 20 under conditions to convert the oxidized form of polymer 20 to the reduced form, such as sodium hydrosulfite, is introduced into anolyte 12 through line 34. The oxidized form of polymer 20 that is formed during the operation of the fuel cell is immediately converted back to the reduced form by the sodium hydrosulfite. In the reduction of polymer 20, the sodium hydrosulfite is oxidized to sodium bisulfite, and water is consumed. Thus, polymer 20 functions in the same manner as does the hydroquinone of said copending application Serial No. 154,258, as shown by the following equation:

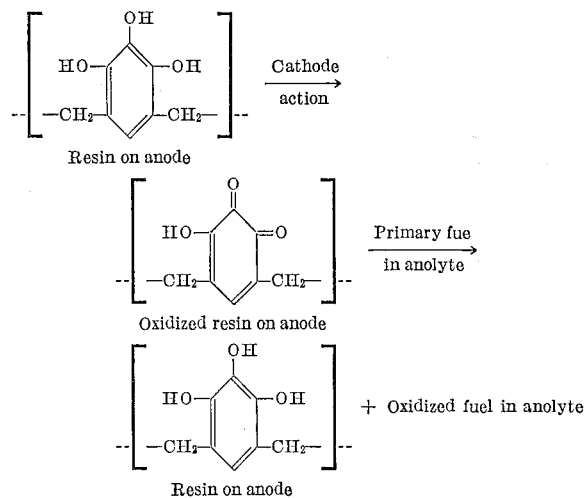

A portion of the anolyte 12, containing sodium hydrosulfite and sodium bisulfite, is continuously withdrawn through line 36 and combined with a non-oxidizable, non-condensable carbonyl compound, such as acetone, introduced through line 38. The solid addition compound resulting from the reaction of sodium bisulfite and the carbonyl compound is removed from anolyte 12 by filter 40, and the solution is returned through line 42 to fuel cell vessel 10. Fresh sodium hydrosulfite is continuously added to anolyte 12 through line 34.

Referring to FIGURE 2, an alkaline electrolyte, such as a concentrated aqueous sodium hydroxide solution, in fuel cell vessel 10 is divided into anolyte 12 and catholyte 14 by semi-permeable membrane 16. Disposed in anolyte 12 in spaced relationship are anode 18 and reversibly-oxidizable polymer 20, impregnated with particles of iron, which are electrically connected by lead 44. Cathode 22 having hollow interior 24 is disposed in catholyte 14. Anode 18 and cathode 22 are respectively connected by lead wires 26 and 28 to lead 30. At the start of the operation of the fuel cell, anolyte 12 contains in solution the primary fuel, as for example, sodium hydrosulfite when polymer 20 is based upon hydroquinone.

During the operation of the cell, an oxygen-containing gas is supplied to catholyte 14 through line 32 and hollow interior 24 where it is forced through the walls of cathode 22, thereby imparting positive charges to cathode 22 and producing hydroxyl ions in catholyte 14. The hydroxyl ions thus formed migrate through semi-permeable membrane 16 into anolyte 12 where they come in contact with polymer 20 and oxidize it. Negative charges are imparted to anode 18 through line 44. The oxidized form of polymer is immediately converted back to the reduced form by the primary fuel in anolyte 12. This regeneration of polymer 20 by the primary fuel causes the primary fuel to be oxidized to sodium bisulfite, and water is consumed.

A portion of anolyte 12 containing sodium hydrosulfite and sodium bisulfite is continuously withdrawn through line 36 and introduced into regeneration unit 46. In regeneration unit 46, the sodium bisulfite is chemically or electrically reduced back to sodium hydrosulfite after which it and the electrolyte are returned through line 42 to vessel 10.

The sodium bisulfite may be chemically reduced back to sodium hydrosulfite by reacting it with chemicals, such as zinc in the presence of sulphurous acid or formic acid, removing any by-products formed during the regeneration of the primary fuel, and possibly adding some fresh sodium hydrosulfite to replace the fuel lost by formation of byproducts during regeneration thereof. The sodium bisulfite may also be regenerated by reversibly charging it, as represented by the equation:

$$2NaHSO_3 + 2H^+ + 2e \rightarrow Na_2S_2O_4 + 2H_2O$$

Although this invention has been described in relation to the specific embodiments, modifications which fall within the intended scope will become apparent to those skilled in the art. For example, any reversibly-oxidizable polymer may be utilized provided it features the characteristics hereinbefore described. A compound which is capable of regenerating the reduced form of the reversibly-oxidizable polymer from its oxidized form can be used as the primary fuel.

The embodiments of the invention in which an exclusive property or privilege is claimed are defined as follows:

1. An apparatus for electrochemically generating electricity comprising a cell vessel containing an aqueous alkaline electrolyte compartment, an oxygen electrode and a fuel electrode disposed in spaced relationship in said electrolyte compartment, said electrolyte compartment being adapted to receive a sodium hydrosulfite fuel and containing oxidizing means comprising the oxidized form of a polymer of a polyhydric phenol selected from the group consisting of hydroquinone and pyrogallol for oxidizing said fuel under conditions to convert the oxidized form of said polymer to the reduced form, said polymer being insoluble in said electrolyte and electrically connected to said fuel electrode, means for introducing free oxygen into said electrolyte compartment in effective proximity to said oxygen electrode and means for withdrawing electrical energy from said electrodes.

2. An apparatus in accordance with claim 1 in which said polymer is incorporated in said fuel electrode.

3. An apparatus in accordance with claim 2 which includes means to divide said electrolyte compartment into two confined zones in electrolytic communication with one another, a cathodic zone in which said oxygen electrode is disposed and said free oxygen is contacted with said electrolyte, and an anodic zone in which said fuel electrode, polymer and fuel are disposed, said means being adapted to permit hydroxyl ions formed in said cathodic zone to migrate to said anodic zone.

4. An apparatus in accordance with claim 3 which includes means for removing the oxidized form of said fuel from said anodic zone and means for adding the reduced form of said fuel to said anodic zone.

5. An apparatus in accordance with claim 4 which includes an auxiliary chamber in communication with said anodic zone for withdrawing electrolyte therefrom, said auxiliary chamber including means for converting the oxidized form of said fuel to the reduced form and means for introducing electrolyte containing the reduced form of said fuel into said anodic zone.

6. An electrochemical process for generating electricity comprising disposing an oxygen electrode and a fuel electrode in spaced relationship in an aqueous alkaline electrolyte solution, disposing in said electrolyte an electrolyte-insoluble reversibly-oxidizable pyrogallol-formaldehyde polymer and electrically connected to said fuel electrode, contacting said electrolyte in effective proximity to said oxygen electrode with free oxygen, introducing in said electrolyte in effective proximity to said polymer a sodium hydrosulfite fuel oxidizable by the oxidized form of said polymer under conditions to convert the oxidized form of said polymer to the reduced form, and withdrawing electrical energy from said electrodes.

7. A process in accordance with claim 6 in which said polymer is incorporated in said fuel electrode.

8. A process in accordance with claim 7 which includes the steps of dividing said electrolyte into an anodic zone and a cathodic zone in electrolytic communication with each other such that hydroxyl ions formed in said cathodic zone can migrate to said anodic zone, said anodic zone being one in which said oxygen electrode is disposed and said cathodic zone being one in which said fuel electrode and polymer are disposed, introducing said fuel in said anodic zone, and contacting said electrolyte with free oxygen in said cathodic zone.

9. A process in accordance with claim 8 in which the oxidized form of said fuel is removed from said electrolyte and the reduced form of said fuel is continuously added thereto.

10. A process in accordance with claim 9 in which the oxidized form of said fuel is continuously removed from said electrolyte and regenerated, and said regenerated fuel is added to said electrolyte.

References Cited by the Examiner

UNITED STATES PATENTS

| | | | |
|---|---|---|---|
| 2,703,792 | 3/1955 | Kropa et al. | 260—54 |
| 2,901,522 | 8/1959 | Bopp | 136—86 X |
| 2,913,511 | 11/1959 | Grubb | 136—86 |
| 2,979,342 | 3/1961 | Morehouse et al. | 136—86 X |
| 3,009,327 | 11/1961 | Weil | 136—86 X |
| 3,032,600 | 5/1962 | Mayer | 136—6 |
| 3,043,898 | 7/1962 | Miller et al. | 136—86 |
| 3,125,468 | 3/1964 | Thompson et al. | 136—120 X |
| 3,134,969 | 5/1964 | Douglas et al. | 136—86 |

WINSTON A. DOUGLAS, *Primary Examiner.*

ALLEN B. CURTIS, *Examiner.*